(12) United States Patent
Torgerson

(10) Patent No.: US 11,176,815 B2
(45) Date of Patent: *Nov. 16, 2021

(54) AGGREGATED ANALYTICS FOR INTELLIGENT TRANSPORTATION SYSTEMS

(71) Applicant: Intel Corporation, Santa Clara, CA (US)

(72) Inventor: Matthew R. Torgerson, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 16/397,784

(22) Filed: Apr. 29, 2019

(65) Prior Publication Data

US 2019/0385445 A1    Dec. 19, 2019

Related U.S. Application Data

(63) Continuation of application No. 15/620,250, filed on Jun. 12, 2017, now Pat. No. 10,282,982, which is a
(Continued)

(51) Int. Cl.
*G01S 19/17* (2010.01)
*G06F 7/00* (2006.01)
(Continued)

(52) U.S. Cl.
CPC ............ *G08G 1/0133* (2013.01); *G01S 19/42* (2013.01); *G08G 1/0112* (2013.01); *G08G 1/16* (2013.01); *H04W 4/14* (2013.01)

(58) Field of Classification Search
CPC .. G08G 1/0133; G08G 1/0104; G08G 1/0112; G08G 1/0968; G08G 1/01;
(Continued)

(56) References Cited

U.S. PATENT DOCUMENTS 8,014,917 B2    9/2011 Hagenbuch
8,457,808 B2    6/2013 Michnik et al.
(Continued)

FOREIGN PATENT DOCUMENTS

WO    WO-2011035799 A1    3/2011
WO    WO-2015094228 A1    6/2015

OTHER PUBLICATIONS

"U.S. Appl. No. 14/354,220, Non Final Office Action dated Oct. 13, 2016", 38 pgs.
(Continued)

*Primary Examiner* — Yuri Kan
(74) *Attorney, Agent, or Firm* — Schwegman Lundberg & Woessner, P.A.

(57) ABSTRACT

Various systems and methods for collecting and generating analytics of data from motor vehicle safety and operation systems are disclosed herein. In one example, various minor vehicle incidents and events such as hard braking, swerving, deceleration, are tracked and correlated to geographic locations. Event data for these incidents may be collected, aggregated, anonymized, and electronically communicated to a processing system for further analysis and identification of problematic roadway and traffic conditions.

25 Claims, 7 Drawing Sheets

Related U.S. Application Data continuation of application No. 14/354,220, filed as application No. PCT/US2013/076132 on Dec. 18, 2013, now Pat. No. 9,679,476.

(51) Int. Cl.

| | | |
|---|---|---|
| *G06F 19/00* | (2018.01) | |
| *G08G 1/01* | (2006.01) | |
| *G01S 19/42* | (2010.01) | |
| *G08G 1/16* | (2006.01) | |
| *H04W 4/14* | (2009.01) | |

(58) Field of Classification Search
CPC ........ G07C 5/008; G06Q 40/08; G06Q 90/00; G08B 13/19645; G01S 19/17; G01S 5/0027; B60L 5/38; G06F 19/00; G06F 7/00
USPC ............................................. 701/1, 33.4, 117
See application file for complete search history.

(56) References Cited

U.S. PATENT DOCUMENTS

| | | | |
|---|---|---|---|
| 8,874,279 B2* | 10/2014 | Frye | ..................... G08G 1/0104 701/1 |
| 9,679,476 B2 | 6/2017 | Torgerson | |
| 10,282,982 B2* | 5/2019 | Torgerson | ............ G08G 1/0133 |
| 2005/0128062 A1 | 6/2005 | Lundsgaard et al. | |
| 2006/0166644 A1 | 7/2006 | Champion | |
| 2007/0150140 A1* | 6/2007 | Seymour | ................ G07C 5/008 701/33.4 |
| 2008/0174486 A1 | 7/2008 | Lee | |
| 2008/0243558 A1 | 10/2008 | Gupte | |
| 2009/0122142 A1 | 5/2009 | Shapley | |
| 2011/0130153 A1 | 6/2011 | Davis | |
| 2012/0004933 A1 | 1/2012 | Foladare et al. | |
| 2012/0095646 A1 | 4/2012 | Ghazarian | |
| 2016/0189544 A1* | 6/2016 | Ricci | ................ G08G 1/096805 701/117 |
| 2016/0293000 A1 | 10/2016 | Torgerson | |
| 2018/0122230 A1 | 5/2018 | Torgerson | |

OTHER PUBLICATIONS

"U.S. Appl. No. 14/354,220, Notice of Allowance dated Feb. 15, 2017", 12 pgs.

"U.S. Appl. No. 14/354,220, Preliminary Amendment filed Apr. 25, 2014", 9 pgs.

"U.S. Appl. No. 14/354,220, Response filed Jan. 13, 2017 to Non Final Office Action dated Oct. 13, 2016", 17 pgs.

"U.S. Appl. No. 15/620,250, Final Office Action dated Sep. 11, 2018", 7 pgs.

"U.S. Appl. No. 15/620,250, Non Final Office Action dated Apr. 23, 2018", 16 pgs.

"U.S. Appl. No. 15/620,250, Notice of Allowance dated Dec. 21, 2018", 9 pgs.

"U.S. Appl. No. 15/620,250, Response filed Jul. 20, 2018 to Non Final Office Action dated Apr. 23, 2018", 11 pgs.

"U.S. Appl. No. 15/620,250, Response filed Nov. 13, 2018 to Final Office Action dated Sep. 11, 2018", 9 pgs.

"International Application Serial No. PCT/US2013/076132, International Preliminary Report on Patentability dated Jun. 30, 2016", 10 pgs.

"International Application Serial No. PCT/US2013/076132, International Search Report dated Sep. 18, 2014", 3 pgs.

"International Application Serial No. PCT/US2013/076132, Written Opinion dated Sep. 18, 2014", 8 pgs.

* cited by examiner

AGGREGATED ANALYTICS FOR INTELLIGENT TRANSPORTATION SYSTEMS

PRIORITY APPLICATIONS

This application is a continuation of U.S. application Ser. No. 15/620,250, filed Jun. 12, 2017, which is a continuation of U.S. application Ser. No. 14/354,220, filed Apr. 23, 2014, now issued as U.S. Pat. No. 9,679,476, which is a U.S. National Stage Application under 35 U.S.C. 371 from international Application No. PCT/US2013/076132, filed on Dec. 18, 2013, published as WO 2015/094228, all of which are hereby incorporated by reference in their entirety.

TECHNICAL FIELD

Embodiments described herein generally relate to data collected and analyzed from motor vehicles and transportation systems, and in particular, to data collected from individual vehicles that is analyzed for safety-related purposes.

BACKGROUND

Cities, municipalities, and other government entities commonly have locations in their road systems that are prone to accidents and traffic issues. These "hot spots" may be caused by inadequate design of traffic control structures (e.g., issues from signal lights, speed limits, inadequately marked road features, and the like), inadequate roadway design (e.g., inadequate intersection flow, inadequate acceleration or merge lanes, or improperly engineered surfaces), or correctable environmental factors (e.g., limited driver visibility due to trees, buildings, and the like).

The private or public authority that manages the road system may have limited knowledge of these problem locations, and will generally only focus remedial efforts at known locations of serious accidents or significant traffic congestion. Thus, analysis and modifications to the existing features of a road system is often only conducted after data is compiled from easily identifiable and well-documented events or traffic conditions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
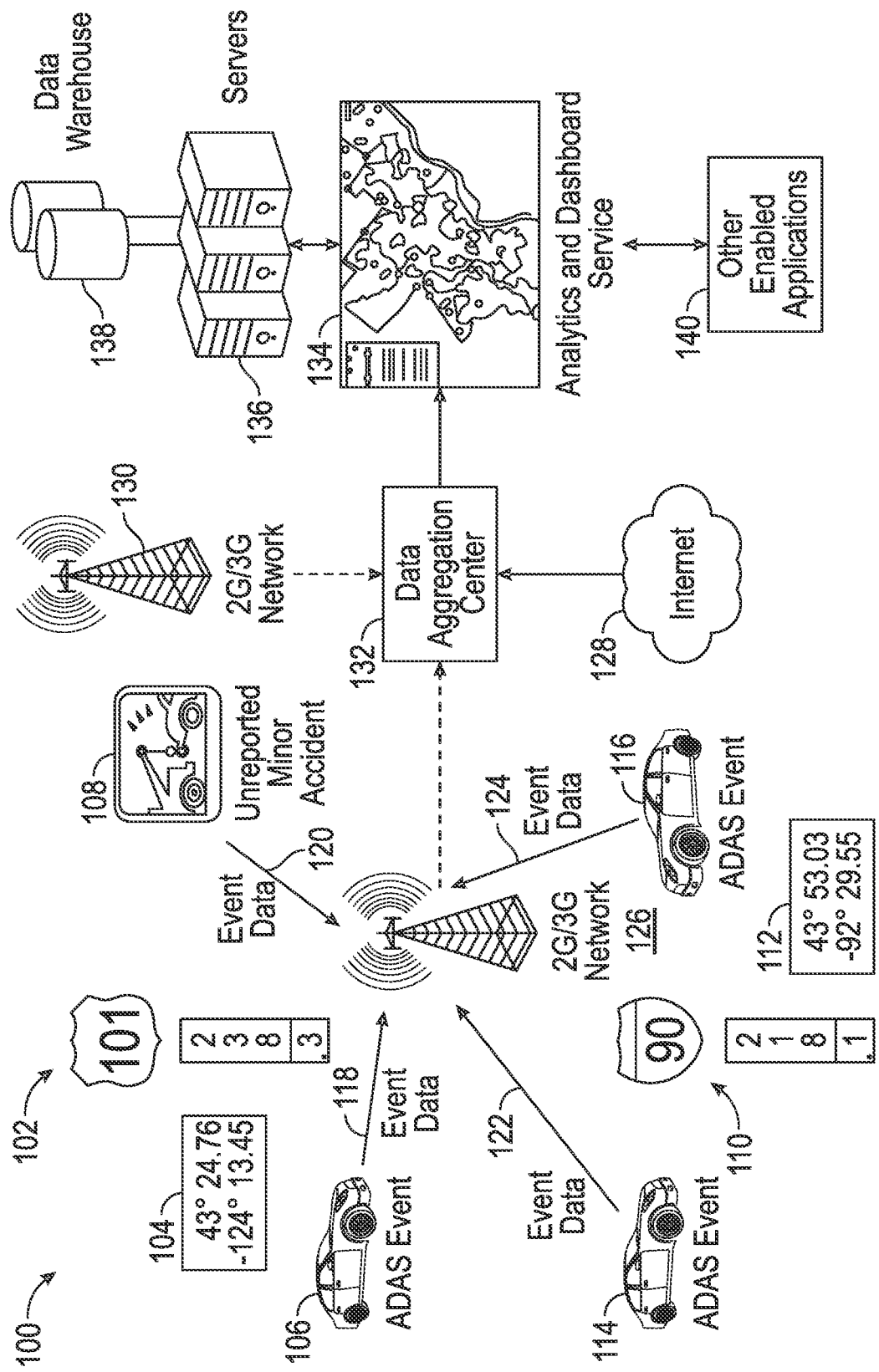
FIG. 1 illustrates an overview of data communications exchanged among automotive service providers, vehicular systems, and data processing systems, according to an embodiment.

In the following description, systems, methods, and machine-readable media including instructions are disclosed that provide functionality for the collection and processing of intelligent transportation data. This intelligent transportation data may be collected from events experienced by a plurality of motor vehicles that occur at a plurality of different locations. For example, data values may be collected on minor incidents experienced by individual vehicles on a roadway, to gather data used in further analysis and reports about the types of adverse events that occur on the roadway. These data values are associated with location information that enables further processing to identify and focus on the location of the otherwise-unreported incidents that occur within a roadway. Additionally, this location information may be used to correlate incidents experienced by different vehicles at the specific location, to indicate frequent or widespread incidents and problems caused by some characteristic of the roadway.

The following description provides various examples of how intelligent transportation data on minor traffic incidents may be collected and derived from individual vehicles. This may include the anonymous and automated collection of event data from advanced driver assistance systems (ADAS) and other safety or information systems within a motor vehicle. The following description further describes techniques of communicating such event data at appropriate times to a remote processing service or system operated by a roadway authority or other appropriate entity, and the type of analytics that may be performed upon this event data to produce useful information.

"Near misses" or other minor driving incidents may include vehicle behavior such as sharp braking, fast deceleration, swerving, and minor collisions. These incidents may occur throughout the road system are often not reported, even though such incidents provide useful information about the state of the roadway and may indicate more serious conditions. For example, a fast slowdown or hard braking event experienced by repeated motorists at a certain location may indicate a location where traffic control or roadway modifications may prevent more serious accidents or ease traffic concerns.

These minor driving incidents, when combined across many different vehicles, periods of time, or road conditions (and combinations thereof), may be used to produce valuable sets of aggregated data. The aggregated data from these incidents may allow the road authority to identify locations with higher occurrences of vehicle incidents in the road system. The aggregated data may be filtered, refined, and further processed to produce useful information. For example, analytics or other report generating techniques may be used to filter and output displays of selected groups of aggregated data, which allow the roadway authority to identify locations where further investigation into problematic roadway or traffic control systems is beneficial. This will allow the roadway authority to take action to reduce or eliminate the road based risk, and potentially prevent future accidents.

FIG. 1 illustrates an overview 100 of data communications exchanged among automotive service providers, vehicular systems, and processing systems. In the following examples, minor vehicle incidents of interest that produce recordable data are referred to as events, with the data produced for such events referred to as event data. It will be understood that such events may be generated as a result of any number of roadway conditions, driver behavior, minor accidents, or vehicle operations that occur along roadways.

As illustrated, events may occur at a first roadway location 102 (e.g., on roadway US 101 at mile marker 238.3) associated with a first set of geographic coordinates 104 (e.g., latitude 43° 24' 76", longitude −124° 13' 45") and at a second roadway location 110 (e.g., on roadway Interstate 90 at mile marker 218.1) associated with a second set of geographic coordinates 112 (e.g., latitude 43° 53' 03", longitude −92° 29' 55"). Data produced for the events is correlated, associated, or enhanced with the respective location(s) of the events, in order to facilitate geographical tracking of the events.

The events that occur at the first roadway location 102 and the first geographic coordinates 104 may include an Advanced Driver Assistance System (ADAS) event 106 producing or contributing to a set of event data 118, and an unreported minor accident event 108 producing or contributing to a set of event data 120. The ADAS event 106 may produce event data 118 as a result of data originating from an on-board electronic subsystem such as a vehicle safety system; whereas the unreported minor accident event 108 may produce the set of event data 120 as the result of an automotive service provider assisting a service call (a service call that may have been manually or automatically initiated by a human or vehicle system).

Likewise, the events that occur at the second roadway location 110 and the second geographic coordinates 112 may include an ADAS event 114 from a third vehicle producing a set of event data 122, and an ADAS event 116 from a fourth vehicle producing a set of event data 124. Each of the event data 118, 120, 122, 124 includes time and location data fields to accompany information from the respective motor vehicle or service provider event. This location data may include the respective geographic coordinates e.g., coordinates 104 for event data 118, 120 and coordinates 112 for event data 122, 124) indicating where the specific ADAS or service provider events occurred.

The event data 118, 120, 122, 124 may be communicated in real-time or with a delay via a cellular network carrier 126 (e.g., a 2G/3G or 4G cellular network carrier). This data may be provided in the form of a data transmission of binary data to a specific service, or may be provided in the form of a standardized data transmission such as a short message service (SMS) or a like "text messaging" service transmission. The data produced by an ADAS event would typically contain small fields of relevant parametric data that would make it ideal for transmission via a SMS message or similar data service. The event data 118, 120, 122, 124 may also be stored in the automobile until a convenient or cost-effective time to transmit the data back to an aggregation center (e.g., when the motor vehicle returns to a parking spot in range of a local area network).

The event data 118, 122, 124 for an ADAS event may include an indication of the type of system activated, such as: anti-lock breaking/breaking assist system, lane departure system, collision avoidance system, and the like. The data for an ADAS event may also include any relevant parametric data to provide values that indicate the operating conditions of the system or systems activated.

As further described, portions of data generated for the ADAS event may be communicated in the event data 118, 122, 124 while ensuring that no user identifiable information is collected. This may be facilitated by a data anonymization component that removes identifying information about the particular motor vehicle, motor vehicle type, or user that provides the information. In another example, the event data may be converted to a standard format or submitted in aggregate with a number of other anonymized events, to enable collection of the underlying data without any possibility of real-time tracking of the motor vehicle driver.

The event data may be transmitted to a processing server or processing system such as a data aggregation center 132, using the internet 128 or transmissions received via 2G and 3G cellular network infrastructure 130. The data aggregation center 132 may collect and aggregate anonymous data from ADAS subsystems, coupled with the geographical location coordinates and time-stamp, to identify locations throughout a roadway or roadway system where driver assist systems or service provider systems have activated (and vehicle incidents and events have occurred). The data aggregation center may provide this event data to an analytics and dashboard service 134, which generates graphical output or reports on the event data with the use of a series of processing servers 136 and databases within a data warehouse 138.

The aggregated data may be further processed in connection with specific analytics and other enabled applications 140. For example, application programming interfaces may be used to interface with the analytics and dashboard service 134, or with the data processed and stored by the servers 136 and the data warehouse 138. Other types of data processing techniques and analysis may be applied upon the aggregated event data by third parties and third party services.

Within the scenarios described herein, the motor vehicles generating the ADAS events 106, 114, 116 may be any type of personal or commercial motor vehicle, such as a car, van, truck, or the like. In addition, the motor vehicles may be a personal transportation device operated by any combination of human, machine-human, or machine control (including autonomously operating transportation devices). The automotive service provider assisting with the unreported minor accident event 108 or like incident may include any number of service providers, such as a tow truck company, repair service, or automotive dealer, which assists the motor vehicle in response to an incident occurring at a particular location on the roadway system.

The ADAS subsystems used in the motor vehicles generating the ADAS events 106, 114, 116 may include any number of safety or human-machine interaction systems that assist vehicle operation or provide data to indicate the status of vehicle operation. As non-limiting examples, these systems may include a lane departure warning system, a collision avoidance system, an object or obstacle detection system, warning systems, a braking system, a camera system, and the like. In addition to data from the ADAS subsystems, other mechanical and electronic system status information from the motor vehicle may be provided with the event data (with information such as motor operating parameters, speed, braking condition, camera image data, or other parameters useful for the determination of the roadway operation of the motor vehicle). Further, the data provided from the ADAS events 106, 114, 116 may be specific to the make or model of vehicle, the event type invoked, or settings established for communication of the ADAS events.

Figure 2:
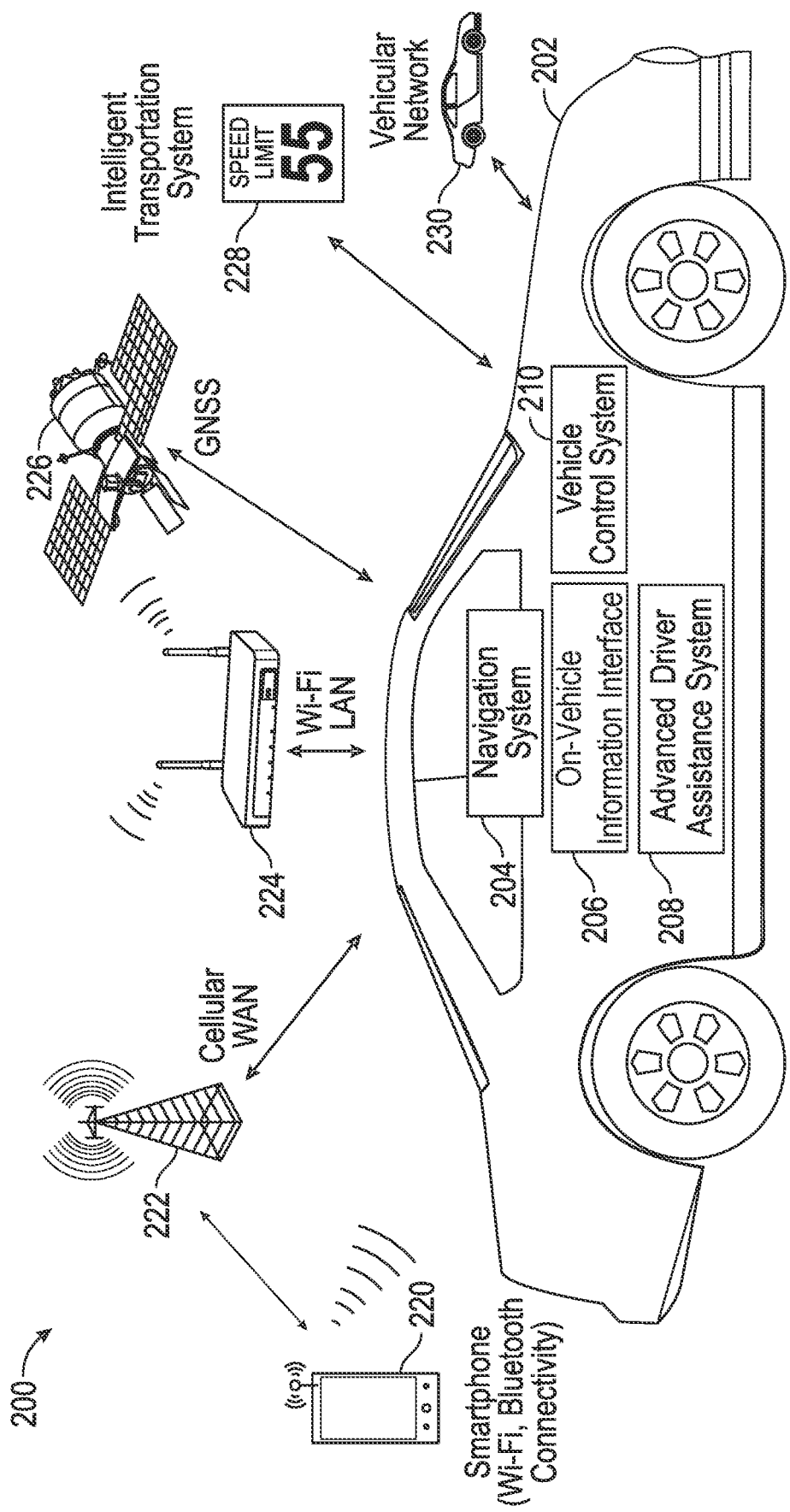
FIG. 2 illustrates an overview of communication mediums and data exchanged with motor vehicle operation systems, according to an embodiment.

FIG. 2 provides an illustration 200 of data communication mediums used and the data communications exchanged with motor vehicle operation systems, which may be used to transmit event data on pertinent traffic and vehicle operation incidents from a motor vehicle 202 to external communication networks. The motor vehicle 202 includes various subsystems within its advanced driver assistance system (ADAS) 208 and vehicle control system 210 that produce useful event data in response to encountered incidents. The ADAS 208 and vehicle control system 210 may also provide output and accept commands within user interfaces provided by a navigation system 204 and an on-vehicle information interface 206 (e.g., an "in-car infotainment system").

The motor vehicle 202 operates its navigation system 204 to receive geographic location coordinates from a global navigation satellite system (GNSS) 226, such as global positioning system (GPS) satellites. The navigation system 204 receives this information at regular intervals and may provide and track a location of the motor vehicle with a high degree of accuracy. The location coordinates available from the navigation system 204 may be further recorded and communicated among the on-vehicle information interface 206, the ADAS 208, the vehicle control system 210, and the incident collection and communication system as further discussed in FIG. 3.

The event data produced by the motor vehicle 202 may be exchanged with an external processing system (e.g., the data aggregation center 132 in FIG. 1) via direct communication with a variety of networks. As one example, the event data may be communicated with a transceiver configured to provide transmissions to a cellular wide area network (WAN) 222, based on an event-driven occurrence or based on a determined schedule. (For example, the event data produced by the incident may be immediately communicated after certain events, or aggregated and communicated with a set of events at a later period of time). The event data produced by the motor vehicle 202 may also be exchanged with the processing system via a communication with a wireless local area network 224, such as a Wi-Fi network located at a parked location of the motor vehicle, with the Wi-Fi network operating according to an IEEE 802.11 standard (e.g., an 802.11a/b/g/n/ac network).

As another example, the event data may be communicated with a smartphone 220 (operated by a human driver or passenger, for example) which is located inside or in proximity to the motor vehicle. The smartphone 220 may receive the event data via Wi-Fi or Bluetooth network communications at regular intervals, and relay the event data communications to the cellular WAN 222. The smartphone 220 may also provide a user interface (through an "app" software application, for example) which enables some user customization, tracking, or diagnostic of event data communications performed or attempted by the motor vehicle.

In other examples, the motor vehicle 202 is configured to exchange communications with an intelligent transportation system 228, or other vehicles within a vehicular network 230. For example, the intelligent transportation system 228 may be deployed with a network established along a roadway that is accessible during operation of the motor vehicle. The intelligent transportation system 228 may be used to provide road condition updates to the motor vehicle 202 such as speed limit changes along the roadway, and receive event data on incidents experienced by the motor vehicle 202. As another example, the vehicular network 230 may be used to provide peer-to-peer or relayed communications about traffic and roadway conditions along the roadway, and various incidents or events that may affect operation of other vehicles. The aggregated event data may be anonymized and exchanged among various peers of the vehicular network, and communicated by select peers of the network to a processing system.

Figure 3:
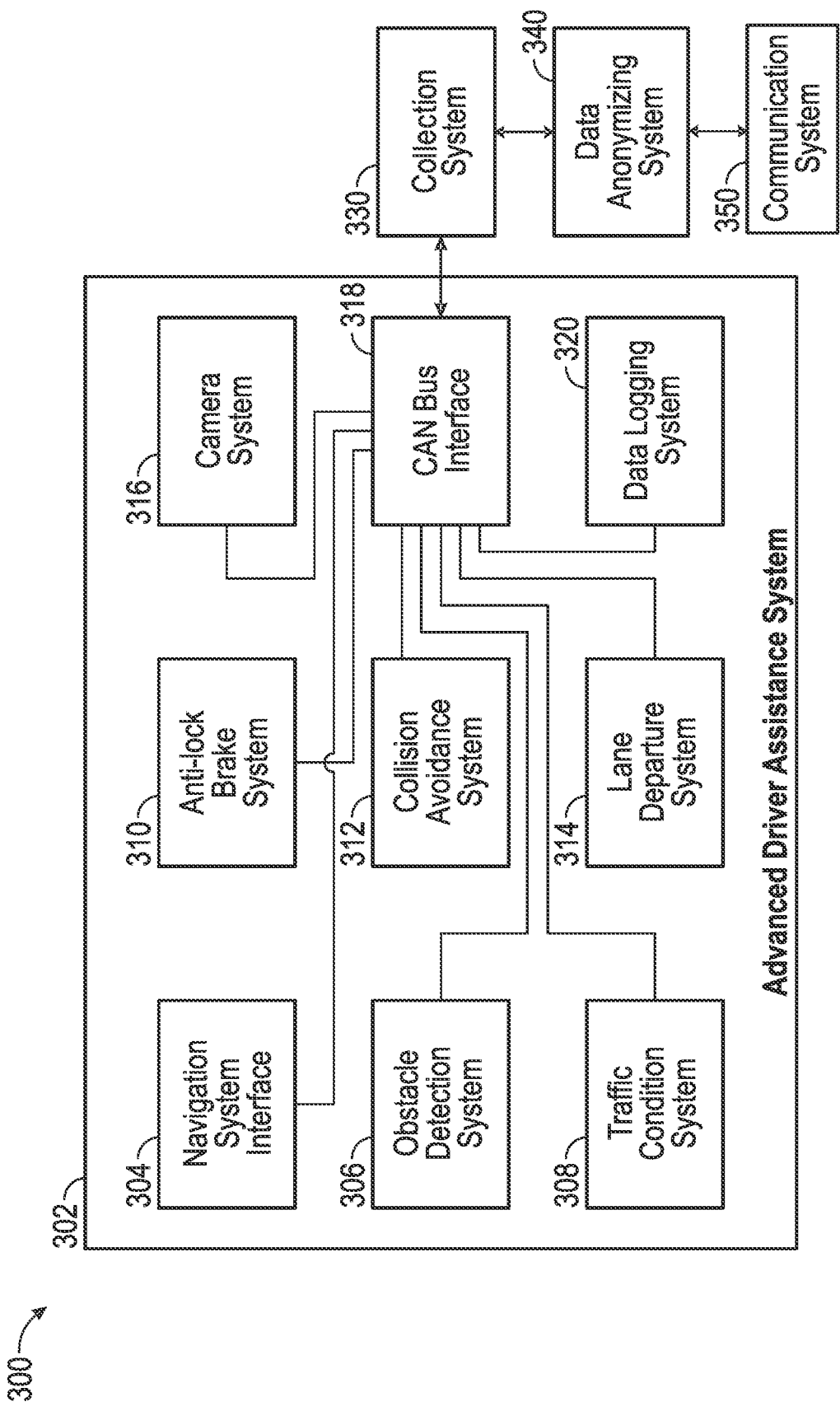
FIG. 3 illustrates a block diagram of components connected with an advanced driver assistance system of a motor vehicle, according to an embodiment.

FIG. 3 illustrates a block diagram 300 of components connected with an advanced driver assistance system (ADAS) 302 of a motor vehicle, according to an embodiment. As shown the ADAS 302 includes a series of subsystems and interfaces. One of these interfaces, the controller area network bus (CAN bus) interface 318, is operably connected with an incident collection system 330. The ADAS also includes a navigation system interface 304 to enable the access to location coordinates and information from the navigation system through the CAN bus interface 318.

Within the ADAS 302, the safety-related subsystems may include an obstacle detection system 306, a traffic condition system 308, an anti-lock brake system 310, a collision avoidance system 312, a lane departure system 314, and a camera system 316. Each of these subsystems may provide guidance to motor vehicle operators or internal vehicle operation systems to address detected safety incidents. Other types of detection subsystems may also be used and deployed within the ADAS 302. In addition, the ADAS 302 may include a data logging system 320 that is configured to capture, record, or maintain certain data values from the respective subsystems operating within the ADAS 302.

The incident collection system 330 is connected to the ADAS 302 through the CAN bus interface 318 and may be used to collect and obtain event data (including location coordinates from navigation system interface 304) from a variety of motor vehicle subsystems. The incident collection system 330 is further operably coupled to a data anonymizing system 340 which enables the removal of sensitive or identifying information for the particular vehicle or vehicle operator prior to communication. The incident collection system 330 is further operably coupled to an incident communication system 350 which enables the communication and exchange of event data and associated information to a processing system or service (using the communication networks and techniques illustrated in FIG. 2, for example).

Figure 4A:
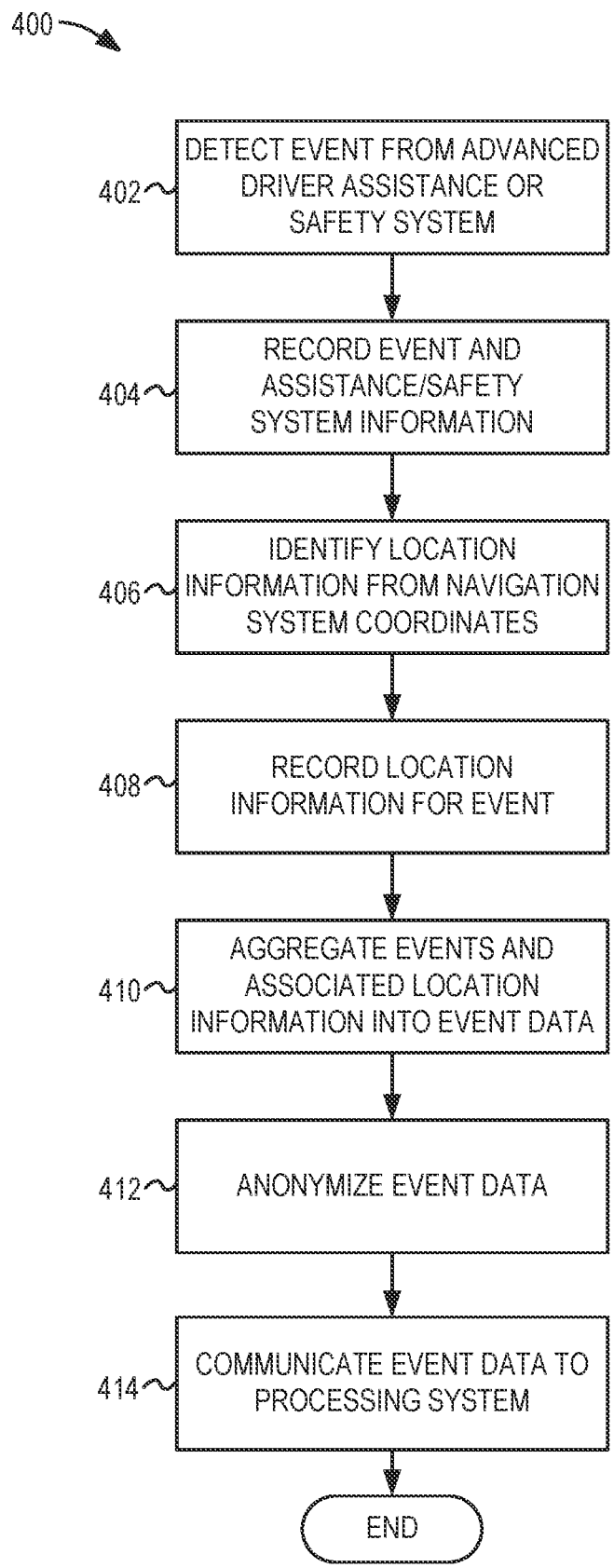
FIGS. 4A and 4B illustrate flowcharts for a method for collecting and reporting aggregated analytics from a vehicular system, according to an embodiment.
Figure 4B:
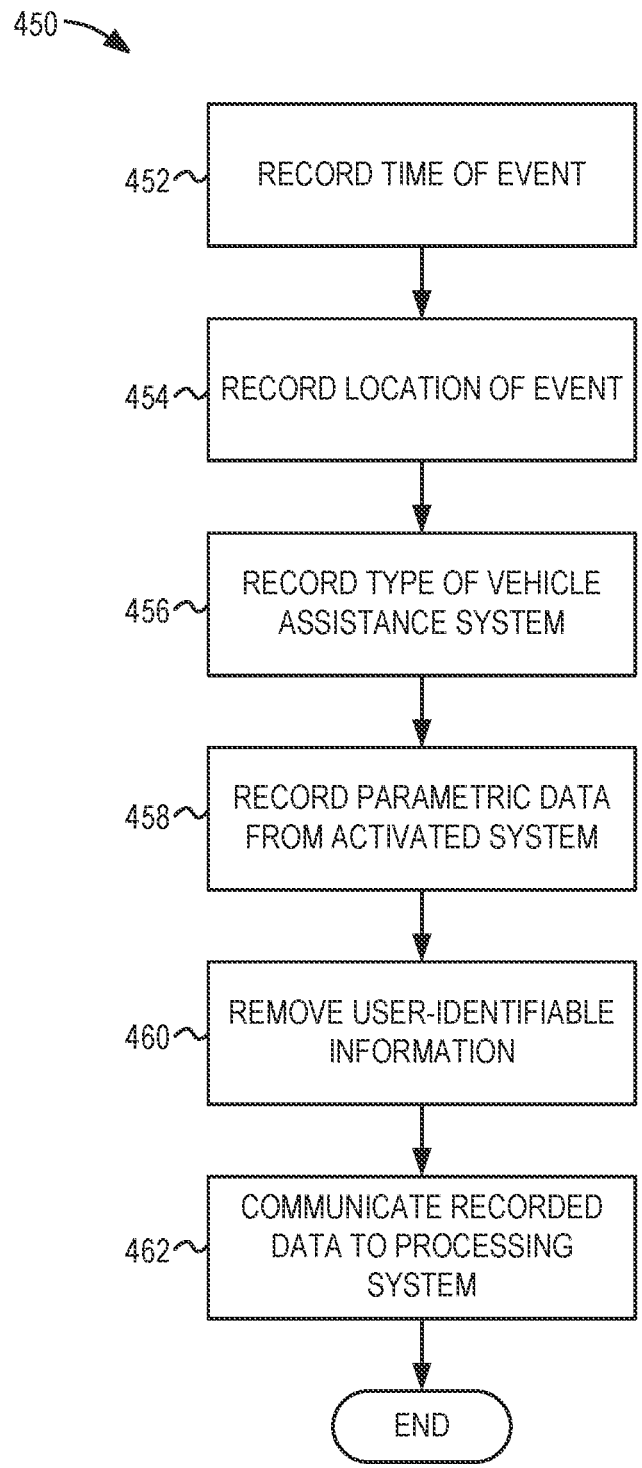

FIGS. 4A and 4B illustrate flowcharts 400, 450 for methods of collecting and reporting aggregated analytics from a vehicular system. These examples each address individual data compiled for a respective incident or event that may occur from operation of the motor vehicle. It will be understood, however, that the techniques illustrated in flowcharts 400, 450 may also be applied to multiple incidents or events occurring at a particular location, or multiple incidents or events occurring at multiple locations or throughout a period of time.

As illustrated in FIG. 4A, the flowchart 400 illustrates operations for collection and communication of vehicle incident event data originating from a discrete event. The operations may include the detection of the particular vehicle incident or event, from monitoring of the ADAS or safety system of the motor vehicle (operation 402). The incident or event may be detected in connection with ongoing monitoring by an incident collection system, or the detection may be event driven. The information produced from the ADAS or safety system, and other information for the vehicle incident or event, may be recorded or stored (operation 404) by the incident collection system.

The location of the particular vehicle incident or event may be determined by identifying location information from coordinates maintained or obtained by a navigation system (operation 406) of the motor vehicle. This location information for the particular vehicle incident or event may be recorded or stored (operation 408) for further processing operations with the event data. The location information in some examples also may be associated or correlated with the particular vehicle incident or event by creating a set of event data (by the incident collection system, for example) that includes both the information from the ADAS system and the navigation system.

In some examples, the information may be communicated directly in real-time or near-real-time to the processing system, with use of a wide area network communication (e.g., a message or data transmission on a cellular mobile phone network). In other examples, the events and associated location information may be combined to communicate a plurality of events. The events and associated location information may be aggregated (operation 410) to provide all event data for a particular motor vehicle over a period of time, for a particular event type over a period of time or number of events, or for events which include certain data values received over a period of time or number of events. The aggregated event data may be anonymized (operation 414) or otherwise processed to remove identifying information collected on the driver, vehicle, vehicle type, or for select incident types. The aggregated event data including the event information and the location information is then communicated to the processing system (operation 414) for analytics and evaluation.

As illustrated in FIG. 4B, the flowchart 450 illustrates additional or alterative operations performed to record vehicle incident event data for an identified vehicle incident or event. The operations depicted in FIG. 4B may occur in an alternate or modified sequence but indicate the types of information that is recorded or stored, and ultimately used for communications to the processing system.

As shown, operations are performed to record the time of the event (operation 452), the location of the event (operation 454), the type of vehicle assistance or safety system that is invoked (operation 456), and any parametric data produced from the activated vehicle or safety system (operation 458). Additional fields of information obtained from the ADAS or safety system also may be recorded for communication with the event data. For example, if the antilock brake system engages, the collection system may check to see if there is any other applicable safety system warning, and if there are cameras, the cameras might record some image or video (e.g., to determine the obstacle or traffic condition that the particular vehicle has encountered).

In some examples, any user- or vehicle-identifying information may be removed, obscured, or modified (operation 460) to enable the anonymous or non-traceable collection of event data. The anonymous collection of the event data is then communicated to the processing system (operation 462).

Figure 5:
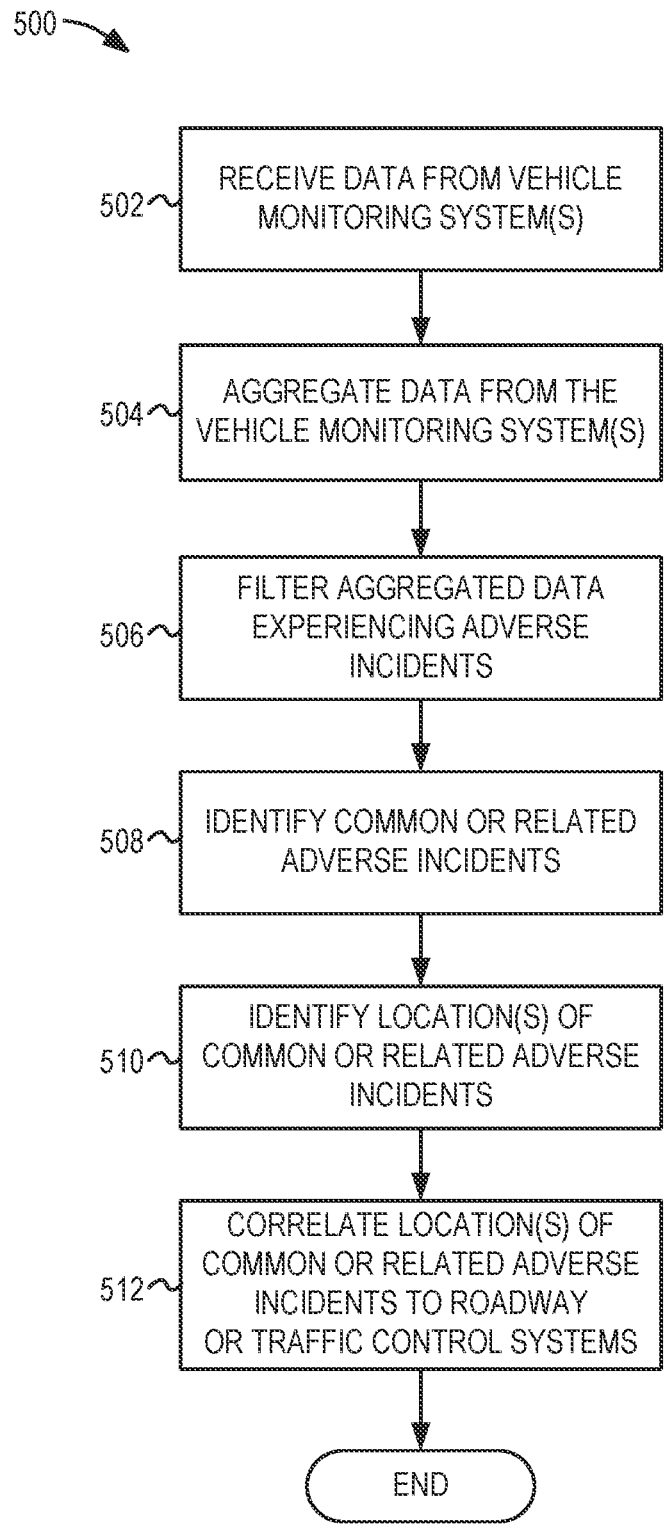
FIG. 5 illustrates a flowchart for a method for performing analytics upon data provided from vehicular systems, according to an embodiment.

FIG. 5 illustrates a flowchart 500 for a method of performing analytics upon data provided from vehicular systems, such as operations performed by a processing system operated by a roadway authority. These operations include processing the receipt of data, received from one or more vehicle monitoring systems (operation 502). A variety of data communications may be received, and the processing system may aggregate data from a plurality of vehicle monitoring systems (operation 504) and locations throughout a particular roadway or roadway system.

Data analytics performed on the aggregated data may include operations including filtering the aggregated data to determine the types of adverse incidents occurring on a roadway (operation 506), identifying common or related incidents occurring within the roadway system (operation 508), and identifying locations of common or related adverse incidents occurring within the roadway system (operation 510). The locations of the common or related adverse incidents may be correlated (operation 512) to further determine the underlying contributing causes of the incidents, which may relate to roadway design or traffic control systems.

Further processing, modeling, and analysis may be performed upon this data to extract usable information to improve characteristics of the roadway or vehicle safety. As one example, the data may be correlated with traffic condition information of particular roadway location(s) of interest obtained from an intelligent transportation system. As another example, analysis of the number of incidents may be produced in the form of a heat map, histogram, or other graphical report. The incidents could also be ranked, sorted, or filtered by the severity of the event (e.g., to identify major deltas in change rapidly). A report could also output a frequency-based histogram, based on longer term data over time, or real-time data that shows roadway conditions building up quickly (from an accident, road hazard, and the like).

While many of the examples described herein refer to a motor vehicle and motor vehicle roadways, it is understood that the data provided in connection with analytics for safety purposes may apply to a variety of transportation vehicles and devices. The data could also be used to enable future, unspecified applications regarding driver patterns, safety critical systems or other infrastructure related services. The data could also be used to improve ADAS or safety systems and improve the performance of motor vehicles in certain locations.

Additionally, the examples described herein may apply to any transportation device that is used on or near a public or private transportation medium. The techniques may be applied beyond motor vehicles to other types of personal transportation devices deployed among smaller scales of roadways (such as bicycles on bicycle paths). Personal transportation devices include, but are not limited to bicycles, tricycles, unicycles, skateboards, kick scooters, wheelchairs, Segway® machines, inline skates, or the like.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
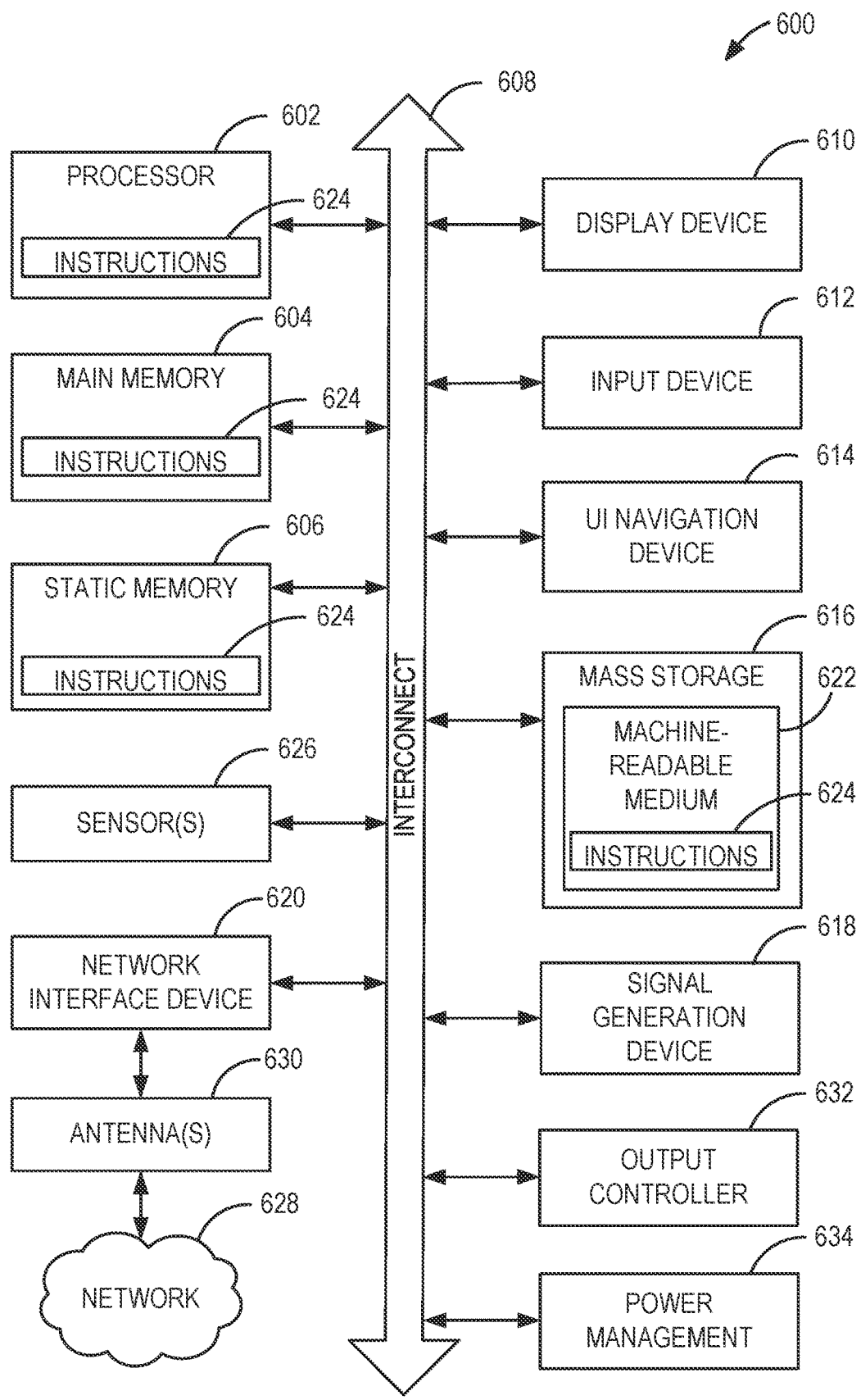
FIG. 6 illustrates a block diagram for an example machine upon which any one or more of the techniques (e.g., operations, processes, methods, and methodologies) discussed herein may be performed, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. Computer system machine 600 may be embodied by the processing servers 136, the data warehouse 138, the smartphone 220, the advanced driver assistance system 208 or 302, the advanced driver assistance system 302, the incident collection system 330, the data anonymizing system 340, the incident communication system 350, or any other electronic processing or computing platform described or referred to herein. Further, the advanced driver assistance system subsystems included in the motor vehicles described herein may include a processing system functioning substantially similar to the following described computer system.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via an interconnect 608 (e.g., a link, a bus, etc.). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), an output controller 632, a power management controller 634, a network interface device 620 (which may include or operably communicate with one or more antennas 630, transceivers, or other wireless communications hardware), and one or more sensors 626, such as a global positioning system (GPS) sensor, compass, accelerometer, location sensor, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 628 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes subject matter (embodied for example by a device, apparatus, machine, or machine-readable medium) arranged or configured to communicate motor vehicle incident data, comprising: an incident collection module coupled to or implemented via a processor and memory, the incident collection module arranged or configured to extract information originating from a driving incident during operation of a motor vehicle, the information originating from the driving incident being provided to the incident collection module from an on-board electronic subsystem of the motor vehicle, and the incident collection module further arranged or configured to determine geographic coordinates of the driving incident provided to the incident collection module from a navigation system of the motor vehicle, wherein the on-board electronic subsystem generates the information in response to the driving incident; and an incident communication module coupled to the processor and memory, the incident communication module arranged or configured to communicate the information originating from the driving incident and the geographic coordinates of the driving incident to a data aggregation system via a network.

In Example 2, the subject matter of Example 1 may optionally include, a data anonymizing module coupled to the processor and memory, the data anonymizing module arranged or configured to anonymize the information originating from the driving incident, wherein the information originating from the driving incident is anonymized to remove identification of the motor vehicle.

In Example 3 the subject matter of any one or more of Examples 1 to 2 may optionally include, the on-board electronic subsystem being an advanced driver assistance system or safety system operating in the motor vehicle, wherein the on-board electronic subsystem provides parametric data indicating operating conditions of the advanced driver assistance system or safety system.

In Example 4 the subject matter of any one or more of Examples 1 to 3 may optionally include, the advanced driver assistance system including one of more of: an obstacle detection system, a traffic condition system, an anti-lock brake system, a collision avoidance or collision detection system, a lane departure system, or a camera system.

In Example 5 the subject matter of any one or more of Examples 1 to 4 may optionally include, the incident collection module and the incident communication module being operably coupled to the advanced driver assistance system or safety system via a controller area network (CAN) bus interface.

In Example 6 the subject matter of any one or more of Examples 1 to 5 may optionally include, the incident collection module being arranged or configured to detect the driving incident based on data values produced by the on-board electronic subsystem.

In Example 7 the subject matter of any one or more of Examples 1 to 6 may optionally include, a transceiver arranged or configured for communication with a cellular phone network, wherein the incident communication module is arranged or configured to communicate the information originating from the driving incident and the geographic coordinates of the driving incident via the cellular phone network using a short message service (SMS) text message.

In Example 8 the subject matter of any one or more of Examples 1 to 7 may optionally include, the incident collection module being arranged or configured to collect data for a plurality of driving incidents wherein the incident communication module is arranged or configured to communicate the data for the plurality of driving incidents to the data aggregation system via the network based on a determined schedule or a determined condition.

In Example 9 the subject matter of any one or more of Examples 1 to 8 may optionally include, the incident communication module being arranged or configured to communicate wirelessly with a mobile electronic device in proximity to the motor vehicle, wherein the mobile electronic device communicates the collected data for the plurality of driving incidents to the data aggregation system via a wide area network.

Example 10 includes, or may optionally be combined with all or portions of the subject matter of one or any combination of Examples 1-9, to embody subject matter (e.g., a method, machine readable medium, or operations arranged or configured from an apparatus or machine) for communicating motor vehicle incident data, which when executed by a machine in operable communication with a motor vehicle, causes the machine to perform operations to: detect a motor vehicle incident from information produced by an on-board advanced driver assistance or safety system of the motor vehicle; capture information of the motor vehicle incident to be reported to an external system; determine location information from a navigation system of the motor vehicle; associate the location information with the information of the motor vehicle incident; and communicate the information of the motor vehicle incident and the location information to the external system.

In Example 11 the subject matter of Example 10 may optionally include, operations to aggregate the information of the motor vehicle incident with a plurality of other motor vehicle incidents, wherein the operations to communicate the information of the motor vehicle incident further communicate the aggregated information of the plurality of other motor vehicle incidents.

In Example 12 the subject matter of any one or more of Examples 10 to 11 may optionally include, the operations to communicate the information of the motor vehicle incident and the plurality of other motor vehicle incidents being performed at a predetermined interval or in response to a collection of a determined number of incidents.

In Example 13 the subject matter of any one or more of Examples 10 to 12 may optionally include, the information of the motor vehicle incident including a time of occurrence for the motor vehicle incident, a type of vehicle subsystem activated in response to the motor vehicle incident, and parametric data obtained from the vehicle subsystem activated in response to the motor vehicle incident.

In Example 14 the subject matter of any one or more of Examples 10 to 13 may optionally include, operations to: remove user identifiable information from the parametric data obtained from the vehicle subsystem activated in response to the motor vehicle incident.

In Example 15 the subject matter of any one or more of Examples 10 to 14 may optionally include, instructions to communicate the information of the motor vehicle incident to the external system including instructions to generate a message with event data including the information of the motor vehicle incident and the location information, wherein the message is formatted for transmission as a short message service (SMS) text message.

In Example 16 the subject matter of any one or more of Examples 10 to 15 may optionally include, the location information from the navigation system of the motor vehicle including global positioning system (GPS) coordinates determined from a global positioning system satellite reception processed by the navigation system.

In Example 17 the subject matter of any one or more of Examples 10 to 16 may optionally include, the information of the motor vehicle incident is correlated with additional information obtained from a communication with: a vehicle control system of the motor vehicle, an intelligent transportation system, or a second motor vehicle received via a vehicular communication network; wherein the operations to communicate the information of the motor vehicle incident and the location information to the external system further communicate the additional information to the external system.

Example 18 includes, or may optionally be combined with all or portions of the subject matter of one or any combination of Examples 1-17, to embody subject matter (e.g., a method, machine readable medium, or operations arranged or configured from an apparatus or machine) with operations performed by a processor and memory of an electronic system in communication with an electronic communication bus of the motor vehicle, the operations including: identifying data from an advanced driver assistance system of a motor vehicle, the data indicating an adverse event detected by the advanced driver assistance system; correlating the identified data to time information and location information, the location information determined from a set of geographical coordinates indicating a roadway location of the adverse event detected by the advanced driver assistance system of the motor vehicle; anonymizing the identified data for the adverse event to remove information specific to the motor vehicle, the anonymized data including the time information and the location information; and communicating the anonymized data for the adverse event to a remote processing service.

In Example 19 the subject matter of Example 18 may optionally include, the anonymized data for the adverse event that is communicated including information indicating of a type of advanced driver assistance system activated, and parametric data produced from activation of the advanced driver assistance system.

In Example 20 the subject matter of any one or more of Examples 18 to 19 may optionally include, correlating the identified data to the location information includes identifying the location information from global navigation satellite system coordinates provided by a navigation system operating in the motor vehicle.

In Example 21 the subject matter of any one or more of Examples 18 to 20 may optionally include, recording the time and the location information for a detected occurrence of the adverse event during operation of the motor vehicle at a designated area of a roadway system.

In Example 22 the subject matter of any one or more of Examples 18 to 21 may optionally include, aggregating information for the adverse event occurring at a first location and a second adverse event at a second location; wherein communicating the anonymized data for the adverse event to a processing system further includes communicating data for the second adverse event to the remote processing service.

In Example 23 the subject matter of any one or more of Examples 18 to 22 may optionally include, the data being communicated from the motor vehicle to the remote processing service using a cellular network, a wireless local area network, or via an internet-connected smartphone.

In Example 24 the subject matter of any one or more of Examples 16 to 23 may optionally include, the identified data from the advanced driver assistance system including data generated from an obstacle detection system, a collision avoidance system, or a lane departure system, and wherein the identified data indicates the type of advanced driver assistance system invoked by the adverse event.

Example 25 includes subject matter embodied by a machine-readable medium including instructions for operation of a motor vehicle monitoring system, which when executed by a machine, cause the machine to perform operations of the subject matter of any one or more of Examples 16 to 24.

Example 26 includes subject matter embodied by an apparatus comprising means for performing any of the methods of the subject matter of any one or more of Examples 16 to 24.

In Example 27 the subject matter may optionally include, or may optionally be combined with all or portions of the subject matter of one or any combination of Examples 1-26 to include, a method, performed by a data processing system including a processor and memory, comprising operations performed by the processor and memory, and the operations including: receiving data from a vehicular monitoring system; aggregating the data from the vehicular monitoring system with data collected from a plurality of other vehicular monitoring systems; filtering the aggregated data based on the types of adverse incidents; identifying common adverse incidents from the filtered aggregated data; and identifying locations of interest in a roadway system, based on proximity of the common adverse incidents to each other.

In Example 28 the subject matter of Example 27 may optionally include, the data being communicated from the vehicular monitoring system to the data processing system using a cellular network.

In Example 29 the subject matter of any one or more of Examples 27 to 28 may optionally include, the data being communicated to the data processing system via the cellular network using a short message service (SMS) text message.

In Example 30 the subject matter of any one or more of Examples 27 to 29 may optionally include, the data being communicated from the vehicular monitoring system to the data processing system using an internet connection to the data processing system via a wireless local area network connection.

In Example 31 the subject matter of any one or more of Examples 27 to 30 may optionally include, the data including a plurality of events aggregated over a period of time.

In Example 32 the subject matter of any one or more of Examples 27 to 31 may optionally include, the data being used to identify driver patterns, safety critical systems of the roadway system, or other infrastructure related services of the roadway system.

In Example 33 the subject matter of any one or more of Examples 27 to 32 may optionally include, the data being used in an analytics service to provide graphical reports on locations of respective incidents or the number of respective incidents.

In Example 34 the subject matter of any one or more of Examples 27 to 33 may optionally include, the data being correlated with information from an intelligent transportation system, wherein the information from the intelligent transportation system provides traffic information for the locations of interest.

In Example 35 the subject matter of any one or more of Examples 27 to 34 may optionally include, the data being correlated with information from automotive service providers collected at the locations of interest.

In Example 36 the subject matter of any one or more of Examples 27 to 35 may optionally include, correlating the identified locations of interest to design elements of the roadway system.

In Example 37 the subject matter of any one or more of Examples 27 to 36 may optionally include, correlating the identified locations of interest to traffic control system elements of the roadway system.

Example 38 includes subject matter for a machine-readable medium including instructions for providing features of a data processing system, which when executed by a machine, cause the machine to perform operations of any one or combination of Examples 27-37.

Example 39 includes subject matter for an apparatus comprising means for performing any one or combination of Examples 27-37.

Example 40 includes, or may optionally be combined with all or portions of the subject matter of one or any combination of Examples 1-39 to include subject matter for an electronic component arranged or configured to interface with a controller area network (CAN) of a motor vehicle, comprising hardware programmed to: detect a subject event from a subsystem accessible on the controller area network; record the subject event and information for the subject event; identify location information from a navigation system accessible on the controller area network; record location information for the subject event; aggregate a plurality of events including the subject event with respective location information for the plurality of events; and communicate the plurality of events to an internet-accessible processing system using a wireless communication initiated by the electronic component.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements n addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for aggregating incident data performed by a data processing system, the method comprising operations executed by processing circuitry of the data processing system, the operations comprising:
    accessing event data provided from operation of a plurality of motor vehicles, wherein the event, data includes data captured from advanced driver assistance systems of respective motor vehicles during vehicle operation in a roadway environment, wherein the event data indicates location information and time information of the vehicle operation for the respective motor vehicles;
    aggregating the event data collected from the plurality of motor vehicles to produce aggregated event data, the aggregated event data being correlated based on the location information and the time information, wherein the aggregated event data includes a plurality of captured incidents indicated among the plurality of motor vehicles;
    identifying an adverse roadway incident from the aggregated event data, occurring in the roadway environment, based on proximities of the plurality of captured incidents to each other as correlated by the location information and the time information;
    associating a location of the adverse roadway incident with a location in the roadway environment that is trackable within a representation of the roadway environment; and
    causing communication of the location of the adverse roadway incident to a device, to enable output with the device that includes an indication of the adverse roadway incident within the representation of the roadway environment.

2. The method of claim 1, wherein the event data is received from the advanced driver assistance systems of the respective motor vehicles via a cellular network or a wireless local area network.

3. The method of claim 1, wherein the event data includes a plurality of events for the respective motor vehicles over a period of time.

4. The method of claim 1, wherein the event data from a respective advanced driver assistance system includes data generated from an object detection system, an obstacle avoidance system, a collision avoidance system, a lane departure system, or a braking system, and wherein the event data indicates a type of advanced driver assistance system invoked by the adverse roadway incident.

5. The method of claim 1, wherein the location information comprises global navigation satellite system coordinates obtained at the respective motor vehicles.

6. The method of claim 1, wherein the adverse roadway incident relates to a collision, a near-miss, or a road hazard, encountered by respective motor vehicles at the location, and wherein the event data is used to identify the adverse roadway incident based on driving patterns of the plurality of motor vehicles, safety-critical systems of the roadway environment, or infrastructure-related systems of the roadway environment.

7. The method of claim 1, further comprising:
storing an association between a geographic location of the adverse roadway incident and a geographic location in the roadway environment.

8. The method of claim 1, wherein identifying the adverse roadway incident includes identifying a location of interest based on multiple locations indicated by the location information, and identifying a type of the adverse roadway incident based on the time information.

9. The method of claim 1, further comprising:
processing the aggregated event data with an analytics service to generate analytics data for graphical output, the analytics data indicating locations of respective incidents or a number of respective incidents; and
causing the analytics data to be communicated to the device, to enable graphical output on the device that, includes the locations of respective incidents or the number of respective incidents within the representation of the roadway environment.

10. At least one non-transitory device-readable storage medium, comprising a plurality of instructions adapted for aggregating motor vehicle incident data, wherein the instructions, upon execution with processing circuitry of an electronic device, are to cause the processing circuitry to perform operations to:
access event data provided from operation of a plurality of motor vehicles, wherein the event data includes data captured from advanced driver assistance systems of respective motor vehicles during vehicle operation in a roadway environment, wherein the event data indicates location information and time information of the vehicle operation for the respective motor vehicles;
aggregate the event data collected from the plurality of motor vehicles to produce aggregated event data, the aggregated event data being correlated based on the location information and the time information, wherein the aggregated event data includes a plurality of captured incidents indicated among the plurality of motor vehicles;
identify an adverse roadway incident from the aggregated event data, that occurs in the roadway environment, based on proximities of the plurality of captured incidents to each other as correlated by the location information and the time information;
tag a location of the adverse roadway incident to a location in the roadway environment that is trackable within a representation of the roadway environment; and
cause communication of the location of the adverse roadway incident to a device, to enable output with the device that includes an indication of the adverse roadway incident within the representation of the roadway environment.

11. The device-readable storage medium of claim 10, wherein the event data is obtained from advanced driver assistance systems of the respective motor vehicles over a cellular network or a wireless local area network.

12. The device-readable storage medium of claim 10, wherein the event data includes a plurality of events for the respective motor vehicles over a period of time.

13. The device-readable storage medium of claim 10, wherein the event data from a respective advanced driver assistance system includes data generated from an object detection system, an obstacle avoidance system, a collision avoidance system, a lane departure system, or a braking system, and wherein the event data indicates a type of advanced driver assistance system invoked by the adverse roadway incident.

14. The device-readable storage medium of claim 10, wherein the location information comprises global navigation satellite system coordinates obtained at the respective motor vehicles.

15. The device-readable storage medium of claim 10, wherein the adverse roadway incident relates to a collision, a near-miss, or a road hazard, encountered by the respective motor vehicles at the location, and wherein the event data is used to identify the adverse roadway incident based on: driving patterns of the plurality of motor vehicles, safety-critical systems of the roadway environment, or infrastructure-related systems of the roadway environment.

16. The device-readable storage medium of claim 10, wherein the instructions are further to cause the processing circuitry to perform operations to:
use an analytics service to process the aggregated event data and generate analytics data for graphical output, the analytics data indicating locations of respective incidents or a number of respective incidents; and
cause communication of the analytics data to the device, to enable graphical output of the locations of respective incidents or the number of respective incidents within the representation of the roadway environment.

17. The device-readable storage medium of claim 10, wherein identification of the adverse roadway incident includes identification of a location of interest based on multiple locations indicated by the location information, and identification of a type of the adverse roadway incident based on the time information.

18. A computing device, comprising:
communication circuitry, comprising an interface to receive event data provided from operation of a plurality of motor vehicles;
processing circuitry, comprising at least one processor; and
at least one memory device having a plurality of instructions stored therein, that when executed by the processing circuitry, result in the computing device performing operations to:
access the event data provided from operation of the plurality of motor vehicles, wherein the event data includes data captured from advanced driver assistance systems of respective motor vehicles during vehicle operation in a roadway environment, wherein the event data indicates location information and time information of the vehicle operation for the respective motor vehicles;
aggregate the event data collected from the plurality of motor vehicles to produce aggregated event, data, the aggregated event data being correlated based on the location information and the time information, wherein the aggregated event data includes a plurality of captured incidents indicated among the plurality of motor vehicles;

identify an adverse roadway incident from the aggregated event data, that occurs in the roadway environment, based on proximities of the plurality of captured incidents to each other as correlated by the location information and the time information;

tag a location of the adverse roadway incident to a location in the roadway environment that is trackable within a representation of the roadway environment; and cause communication of the location of the adverse roadway incident to a device, to enable output with the device that includes an indication of the adverse roadway incident, within the representation of the roadway environment.

19. The computing device of claim 18, wherein the event data is obtained from the advanced driver assistance systems of the respective motor vehicles over a cellular network or a wireless local area network.

20. The computing device of claim 18, wherein the event, data includes a plurality of events for the respective motor vehicles over a period of time.

21. The computing device of claim 18, wherein the event data from a respective advanced driver assistance system includes data generated from an object detection system, an obstacle avoidance system, a collision avoidance system, a lane departure system, or a braking system, and wherein the event data indicates a type of advanced driver assistance system invoked by the adverse roadway incident.

22. The computing device of claim 18, wherein the location information comprises global navigation satellite system coordinates obtained at the respective motor vehicles.

23. The computing device of claim 18, wherein the adverse roadway incident relates to a collision, a near-miss, or a road hazard, encountered by the respective motor vehicles at, the location, and wherein the event data is used to identify the adverse roadway incident as based on: driving patterns of the plurality of motor vehicles, safety-critical systems of the roadway environment, or infrastructure-related systems of the roadway environment.

24. The computing device of claim 18, wherein identification of the adverse roadway incident includes identification of a location of interest based on multiple locations indicated by the location information, and identification of a type of the adverse roadway incident based on the time information.

25. The computing device of claim 18, wherein the instructions are further to cause the processing circuitry to perform operations to:

use an analytics service to process the aggregated event data and generate analytics data for graphical output, the analytics data indicating locations of respective incidents or a number of respective incidents; and cause communication of the analytics data to the device, to enable graphical output of the locations of respective incidents or the number of respective incidents within the representation of the roadway environment.

\* \* \* \* \*

UNITED STATES PATENT AND TRADEMARK OFFICE
CERTIFICATE OF CORRECTION

PATENT NO. : 11,176,815 B2
APPLICATION NO. : 16/397784
DATED : November 16, 2021
INVENTOR(S) : Matthew R. Torgerson Page 1 of 1

It is certified that error appears in the above-identified patent and that said Letters Patent is hereby corrected as shown below:

In the Claims

In Column 16, Line 26, in Claim 1, delete "event," and insert --event-- therefor In Column 17, Line 28, in Claim 9, delete "that," and insert --that-- therefor In Column 18, Line 62, in Claim 18, delete "event," and insert --event-- therefor In Column 19, Line 14, in Claim 18, delete "incident," and insert --incident-- therefor In Column 19, Line 20, in Claim 20, delete "event," and insert --event-- therefor In Column 20, Line 8, in Claim 23, delete "at," and insert --at-- therefor Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*